(12) United States Patent
Wong et al.

(10) Patent No.: US 7,428,428 B2
(45) Date of Patent: Sep. 23, 2008

(54) SYSTEMS AND METHODS FOR WIRELESS NETWORK RANGE EXTENSION

(75) Inventors: Cheong-Yui Wong, Hong Kong (CN); Vincent Lau, Hong Kong (CN); Soung C. Liew, Hong Kong (CN); Pui Bill Wong, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 609 days.

(21) Appl. No.: 10/833,626

(22) Filed: Apr. 28, 2004

(65) Prior Publication Data

US 2005/0255892 A1 Nov. 17, 2005

(51) Int. Cl.
*H04M 1/00* (2006.01)
*H04B 1/38* (2006.01)

(52) U.S. Cl. ............ 455/562.1; 455/560; 455/561
(58) Field of Classification Search .......... 455/562.1, 455/560, 561
See application file for complete search history.

(56) References Cited

U.S. PATENT DOCUMENTS

| | | | |
|---|---|---|---|
| 4,849,963 A | 7/1989 | Kawano et al. | |
| 5,812,933 A | 9/1998 | Niki | |
| 7,158,501 B2 * | 1/2007 | Kasami et al. | 370/339 |
| 7,215,926 B2 * | 5/2007 | Corbett et al. | 455/41.2 |
| 7,236,759 B2 * | 6/2007 | Cha et al. | 455/275 |
| 2001/0034236 A1 * | 10/2001 | Tong et al. | 455/450 |
| 2002/0098843 A1 | 7/2002 | Struhsaker | |
| 2003/0048770 A1 * | 3/2003 | Proctor | 370/349 |
| 2003/0146876 A1 * | 8/2003 | Greer et al. | 343/702 |
| 2004/0114535 A1 * | 6/2004 | Hoffmann et al. | 370/252 |
| 2004/0162115 A1 * | 8/2004 | Smith et al. | 455/562.1 |
| 2004/0204108 A1 * | 10/2004 | Etkin et al. | 455/562.1 |
| 2004/0224637 A1 * | 11/2004 | Silva et al. | 455/63.4 |
| 2004/0242274 A1 * | 12/2004 | Corbett et al. | 455/562.1 |

(Continued)

FOREIGN PATENT DOCUMENTS

KR 2003014801 A 2/2003

(Continued)

OTHER PUBLICATIONS

International Search Report issued for PCT/CN2005/000274, dated May 26, 2005.

*Primary Examiner*—Matthew Anderson
*Assistant Examiner*—Bobbak Safaipour
(74) *Attorney, Agent, or Firm*—Fulbright & Jaworski L.L.P.

(57) ABSTRACT

Disclosed are systems and methods which provide high bandwidth data communication with respect to a large coverage area using smart antenna and/or directional antenna techniques. Embodiments provide extended wireless local area network (WLAN) coverage areas using a directional antenna, with the cooperation of a cellular system or proprietary WLAN infrastructure to perform best antenna beam pattern estimation and signaling. Stations disposed beyond a WLAN coverage area may establish contact and exchange signaling information with an access point through a secondary control channel. Such a secondary control channel signaling may be relatively low bandwidth and may be utilized to identify the need to communicate data, to identify a "best" directional antenna beam through which to communicate data, etcetera. Payload data may then be transmitted at a high bit rate through one or more smart antenna beams targeted at the appropriate stations.

7 Claims, 3 Drawing Sheets

U.S. PATENT DOCUMENTS

2004/0242275 A1* 12/2004 Corbett et al. ............ 455/562.1
2005/0075140 A1*  4/2005 Famolari ................... 455/562.1
2005/0159187 A1*  7/2005 Mendolia et al. ......... 455/562.1
2005/0164744 A1*  7/2005 du Toit .................... 455/562.1
2005/0208975 A1*  9/2005 Lau ......................... 455/562.1
2006/0040709 A1*  2/2006 Adachi et al. ............ 455/562.1

FOREIGN PATENT DOCUMENTS

| WO | WO9805180 A1 | 2/1998 |
| WO | WO9833233 A1 | 7/1998 |

* cited by examiner

SYSTEMS AND METHODS FOR WIRELESS NETWORK RANGE EXTENSION

CROSS-REFERENCE TO RELATED APPLICATIONS

The present application is related to and commonly assigned U.S. patent application Ser. No. 10/778,923 entitled "Busy Tone For Wireless Networks," filed Feb. 13, 2004, and Ser. No. 10/348,843 entitled "Wireless Local Area Network Time Division Duplex Relay System with High Speed Automatic Up-Link and Down-Link Detection," filed Jan. 22, 2003, the disclosures of which are hereby incorporated herein by reference.

TECHNICAL FIELD

The present invention is related generally to wireless communications and, more particularly, to providing wireless communications with extended range.

BACKGROUND OF THE INVENTION

Wireless communication systems typically have a base station or access point from which radio signals are transmitted and propagate. These signals are then received by a mobile station, remote station, user station, etcetera (referred to herein collectively as station) allowing communication to proceed. Stations may be, for example, a computer with a wireless modem such as a notebook computer fitted with a wireless local area network (WLAN) card (referred to herein as a wireless notebook), mobile telephone or a wireless personal digital assistant.

Wireless communication systems typically provide two-way or duplex communication so that an access point can exchange data with or "talk" to a station, such as a wireless notebook, and the station can "talk" to the access point. In effect, there are two separate radio links by which these two signals travel, known respectively as the down-link and up-link.

Radio frequency (RF) signals can only propagate a certain distance before their power level is appreciably attenuated. For example, there is a distance from a transmission source (e.g., transmitting antenna) at which the RF signal level falls below a certain threshold and cannot be usefully received. The area around a network access point in which signals can be received is known as the coverage area and is sometimes referred to as a cell. When a station moves outside the coverage area signals cannot be received and communication is not possible. Accordingly it is often desirable to implement wireless systems that create as large a network coverage area as possible at minimum cost.

Recently, wireless communications have been combined with local area network (LAN) systems to provide wireless LAN (WLAN) configurations in which stations may be freely distributed throughout a workspace, e.g., an office building, and provided with high bandwidth data communications (such as on the order of 10 to 54 mega-bits per second (Mbps)) without a network cable attached to the stations. Accordingly, WLAN infrastructure has been designed for indoor pedestrian (ambulatory mobility) access over relatively short distances (e.g., on the order of 1-30 meters). It is a challenging problem to extend the coverage area of a WLAN system to provide high bandwidth coverage in outdoor public areas.

One technique which has been implemented to extend the coverage area of a network is by the use of a relay or repeater system. The relay is a system that receives, amplifies and re-transmits radio signals at a higher power level. By placing a relay on the edge of an area of coverage, the relay receives, amplifies and re-transmits the signals from a first coverage area to a second coverage area, thus extending the coverage area of the original signals. However, the use of repeaters in providing extended coverage areas is not without problems. One of the significant problems for repeaters is that of feedback (i.e., some signals from the transmitter are fed back to the receiver of the repeater) causing the system to oscillate.

Examples of prior attempts to provide extended coverage using relay systems are shown in U.S. Pat. No. 5,812,933, issued to Niki, and U.S. Pat. No. 4,849,963, issued to Kawano, the disclosures of which are incorporated herein by reference. The relay system of Niki relies upon the cellular protocols used therein, clearly defining when up-link and down-link transmissions can occur, to prevent oscillation caused by feedback. If a protocol allowing simultaneous up-link and down-link transmission, such as a carrier sense multiple access/collision avoidance (CSMA/CA) protocol were used, the system of Niki would experience an increased chance of oscillation. The relay system of Kawano uses different frequency bands in the up-link and down-link (isolation between these two signal paths is provided by the protocol) such that a duplexer network is used to separate up-link and down-link signals and provide sufficient isolation without oscillation. Accordingly, the foregoing relay system configurations are not well suited for use with respect to a wide variety of communications protocols, particularly those commonly used with respect to WLANs (e.g., those implementing CSMA/CA protocols and/or time division duplexing (TDD)).

Cellular systems have been adapted to carry data communications over wireless links of relatively long distances (e.g., 500 meters or more). However, such cellular systems have heretofore provided such data communications with data rates much lower than those expected using WLAN communications. For example, third generation (3G) cellular systems provide macrocell coverage areas, but with a relatively low bit rate of 2 Mbps.

Accordingly, there is a need for a system and method for providing relatively high bandwidth data communication in a large coverage area, such as a macrocell having a radius on the order of 500 meters or more. There is a further need for a system and method for extending a coverage area of WLAN infrastructure to provide WLAN data communication in a large coverage area.

BRIEF SUMMARY OF THE INVENTION

The present invention is directed to systems and methods which provide relatively high bandwidth data communication with respect to a large coverage area using smart antenna and/or directional antenna techniques. Preferred embodiments of the invention use the foregoing smart antenna and/or directional antenna techniques in combination with out of band signaling (by out of band signaling it is meant in this context that the signaling is outside of the high bandwidth data communication, although the same frequency, protocol, etcetera may be used) in order to establish high bandwidth communication. Embodiments of the invention provide larger or extended WLAN coverage areas using a directional antenna, with the cooperation of a cellular system or a WLAN system to perform best antenna beam pattern estimation and signaling.

The range of WLAN infrastructure is extended through the use of a smart antenna according to embodiments of the present invention. In operation, a station disposed within the coverage area of the WLAN infrastructure (WLAN coverage area) may operate in a substantially conventional manner to communicate with an access point using high data rate links. However, stations disposed beyond the WLAN coverage area, but within extended range areas, preferably establish contact and exchange signaling information with the access point through a secondary or out of band control channel. The secondary control channel may be provided through cellular coverage or through extended range mode WLAN coverage according to embodiments of the invention.

Secondary control channel signaling may be relatively low bandwidth and may be utilized to identify the need to communicate data, to identify a "best" directional antenna beam through which to communicate data, etcetera. Payload data may then be transmitted at a high bit rate through one or more smart antenna beams targeted at the appropriate stations. Accordingly, conventional cellular coverage or extended range mode coverage in combination with a dual mode remote station may be utilized according to embodiments of the present invention to expand the operating range of WLAN systems to the range of underlying cellular coverage.

Additionally or alternatively, a station disposed within the WLAN coverage area, but perhaps at a distance unsuitable for high bandwidth WLAN communications (e.g., reduced bit rate communication) may establish contact and exchange signaling information with the access point through a low speed WLAN connection to indicate a need for a high bandwidth link. Similar to the secondary control channel operation described above, this low speed link may be utilized to identify a "best" directional antenna beam through which to communicate data, etcetera. Payload data may then be transmitted at a high bit rate through one or more smart antenna beams targeted at the station.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Embodiments of the present invention provide high bandwidth data communication within a large coverage area using smart antenna and/or directional antenna techniques and secondary control channel or out of band signaling (by out of band signaling it is meant in this context that the signaling is outside of the high bandwidth data communication, although the same frequency, protocol, etcetera may be used). For example, a larger or extended WLAN coverage area may be provided according to the present invention using a controllable directional antenna configuration, with the cooperation of a cellular system or a WLAN system adapted according to the present invention to perform best antenna beam pattern estimation and signaling. In operation according to such an embodiment, a station disposed within the coverage area of the WLAN infrastructure (WLAN coverage area) may operate in a substantially conventional manner to communicate with an access point using high data rate links. Stations disposed within the WLAN coverage area, but beyond a distance at which higher bandwidth wireless communication is supported, may establish contact and exchange signaling information with the access point through lower bandwidth WLAN links in order to be provided a higher bandwidth data communication link. Stations disposed beyond the WLAN coverage area, but within extended range areas, may establish contact and exchange signaling information with the access point through a secondary control channel in order to be provided a high bandwidth data communication link. High bit rate data may then be transmitted through one or more directional antenna beams targeted at the appropriate stations. Accordingly, conventional cellular coverage or extended range mode coverage in combination with a dual mode remote station may be utilized according to embodiments of the present invention to expand the operating range of WLAN systems.

Although exemplary embodiments are described herein with reference to WLAN networks, the concepts of the present invention are not limited in application to such networks. It will be appreciated by those of skill in the art that the concepts of the present invention may be applied to a variety of wireless communication links, whether conforming to protocols generally associated with WLAN networks or otherwise and whether including a node which is referred to as an access point or not.

Figure 1:
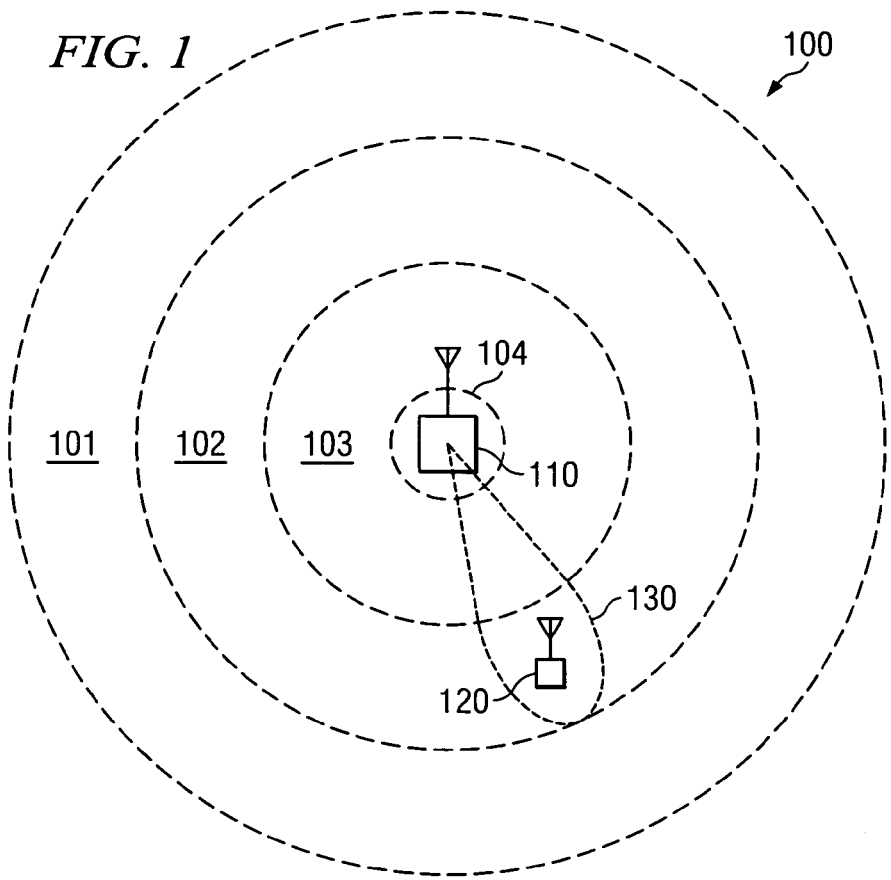
FIG. 1 shows a wireless communication coverage area associated with an access point or base station of a wireless network.

Directing attention to FIG. 1, a wireless communication coverage area associated with an access point or base station of a wireless network is shown. Specifically, FIG. 1 shows wireless network system 100 wherein access point or base station 110 provides wireless communication coverage area 101 in which wireless communications between remote, possibly mobile, stations, such as station 120, may be established with base station 110. Wireless communication between base station 110 and stations such as station 120 is preferably bi-directional and may be accomplished according to a number of protocols, such as IEEE 802.11, third-generation cellular (3G), general packet radio service (GPRS), short message service (SMS), global system for mobile (GSM), etcetera, as well as combinations thereof.

Although not shown in FIG. 1 in order to simplify the drawing, system 100 may comprise any number of base stations and/or stations deemed appropriate to a particular situation. Base stations of such a system may be interconnected and/or connected to backbone communications, such as a local area network (LAN), a metropolitan area network (MAN), a wide area network (WAN), the Internet, the public switched telephone network (PSTN), a satellite communication system, a cable network, and/or the like. Similarly, remote stations such as station 120 may comprise one or more systems, such as a network of computers (e.g., LAN, MAN, WAN, etcetera), or stand-alone terminals, such as a personal computer (PC), personal digital assistant (PDA), notebook computer, cellular telephone, etcetera, having a wireless interface operable as described herein.

According to preferred embodiments of the invention, coverage area 101 is a relatively large outdoor area, such as may extend a distance on the order of 500 meters or more from base station 110 in all directions, as may correspond to the coverage area of a cellular telephone communication system base transceiver station (BTS) coverage area (commonly referred to as a cell). As will be better appreciated from the discussion below, embodiments of the present invention co-locate high bandwidth WLAN infrastructure operable according to the present invention with cellular telephone communication system infrastructure in order to provide high bandwidth communications throughout a coverage area corresponding to that of a cell. Accordingly, base station 110 may comprise both WLAN infrastructure and cellular telephone communication system infrastructure according to the present invention. Alternatively, WLAN infrastructure may be adapted to provide signaling etcetera as described in further detail below such that embodiments of base station 110 may comprise substantially only WLAN infrastructure adapted according to embodiments of the invention.

Referring still to FIG. 1, coverage area 101 of the illustrated embodiment comprises a plurality of coverage area portions. Specifically, coverage area portion 103, comprising the area most near base station 110, defines an area in which a station may operate in a substantially conventional manner to communicate with base station 110 using WLAN protocols and links. Accordingly, coverage area portion 103 is referred to herein as a WLAN coverage area. However, coverage area portion 102, comprising the area further removed from base station 110, defines an extended range area in which conventional techniques for providing high data rate links are not effective. Accordingly, as will be more fully described below, stations such as station 120 disposed in coverage area portion 102 will preferably establish contact and exchange signaling information with base station 110 through a control channel operable according to the present invention in order to establish high bandwidth communication links using directional antenna beams of a smart antenna system, such as directional antenna beam 130, thereby facilitating a high bandwidth communication extended range area.

Coverage area portion 103 of the illustrated embodiment comprises a plurality of coverage area sub-portions. Specifically, coverage area sub-portion 104, comprising the area most near base station 110, defines an area in which a station may operate in a substantially conventional manner to communicate with base station 110 using higher data rate links. Accordingly, coverage area sub-portion 104 is referred to herein as a WLAN high data rate coverage area. However, the coverage area sub-portion falling outside of coverage area sub-portion 104 and within coverage area portion 103 defines an area in which WLAN higher data rate links are not supported by conventional means, although WLAN communication is supported. As will be described in further detail below, this sub-portion of coverage area portion 103 may be provided higher bandwidth WLAN communication according to the present invention, and therefore is referred to herein as an extended WLAN high data rate coverage area.

It should be appreciated that, although coverage area portion 102 of the illustrated embodiment is shown smaller than coverage area 101, there is no such limitation with respect to the size of an extended range area provided according to the present invention. Accordingly, embodiments of the invention may provide an extended range area which is larger, smaller, or substantially co-extensive with any underlying coverage area or other region.

As previously mentioned, signaling used in facilitating high bandwidth communication in an extended range area of the present invention may be provided by a number of alternative embodiments. Accordingly, the following discussion shall provide detail with respect to 2 such alternative configurations. Specifically, the discussion of FIG. 2 which follows describes an embodiment wherein signaling is provided by a separate, substantially co-extensive, communication system (e.g., an underlying cellular telephone communication system) to facilitate high bandwidth communication links in an extended range area according to the present invention. In contrast, the discussion of FIG. 6 which follows describes an embodiment wherein signaling is provided by adaptation of WLAN infrastructure to facilitate high bandwidth communication links in an extended range area according to the present invention.

Figure 2:
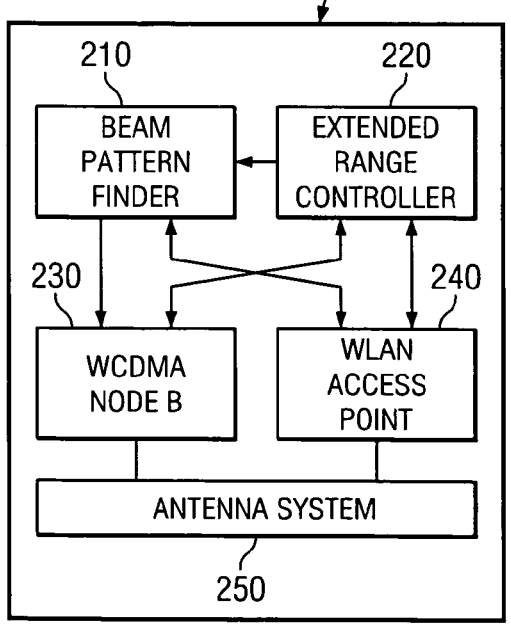
FIG. 2 shows a configuration of a base station adapted to provide cellular assisted range extension according to an embodiment of the invention.

Directing attention to FIG. 2, an exemplary configuration of base station 110 adapted to provide cellular assisted range extension according to an embodiment of the invention is shown. The system configuration of FIG. 2 includes a remote station and a base station adapted to receive and transmit both cellular and WLAN signals (e.g., dual-mode remote and base stations). Accordingly, base station 110 of FIG. 2 includes a communication node adapted to facilitate communications according to cellular telephone protocols as well as a communication node adapted to communicate according to WLAN protocols. Specifically, base station 110 of the illustrated embodiment includes cellular (e.g., wideband code division multiple access (WCDMA)) node B 230, such as may provide for wireless communication according to cellular third-generation (3G) protocols, and WLAN access point 240, such as may provide for wireless communication according to IEEE 802.11 protocols.

Figure 3:
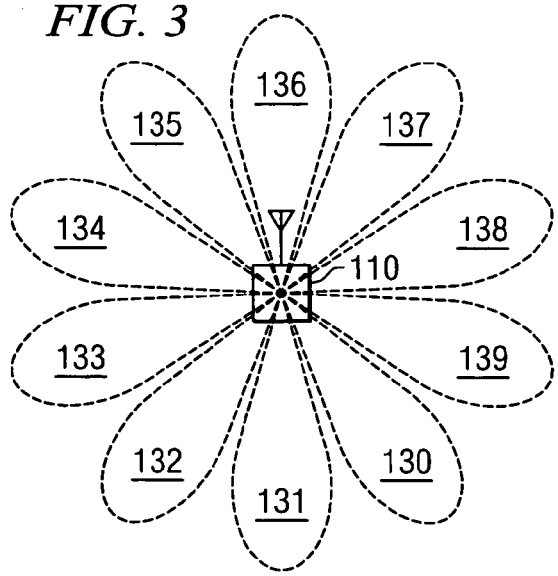
FIG. 3 shows an embodiment wherein an antenna system provides relatively narrow directional antenna beams which are angularly diverse.

Both cellular node B 230 and WLAN access point 240 of the illustrated embodiment couple to antenna system 250 to provide similar antenna beam patterns. For example, antenna system 250 may provide multiple directional antenna beams, perhaps being angularly, spatially, gain, and/or beam width diverse. FIG. 3 shows an embodiment wherein antenna system 250 provides relatively narrow directional antenna beams 130-139 which are angularly diverse. It should be appreciated that additional or alternative antenna beam configurations may be utilized according to embodiments of the invention. For example, omni-directional and/or antenna beams having a relatively broad beam width (e.g., 120° sector antenna beams) may be used in combination with narrow antenna beams such as those illustrated in FIG. 3. In particular, embodiments of the present invention utilize broad beam width antenna beams with respect to particular communication links, such as an omni-directional antenna beam used with WLAN access point 240 when providing substantially conventional communication links within coverage area portion 103 (FIG. 1) and/or a sector antenna beam used with cellular node B 230 when providing a pilot signal within coverage area 101 (FIG. 1). Accordingly, antenna system 250 may be comprised of one or more antenna element configurations, including switched beam arrays, adaptive arrays, onmi-directional antennas, and/or combinations thereof. Moreover, although cellular node B 230 and WLAN access point 240 are each coupled to antenna system 250 to provide at least some similar antenna beam patterns, such antenna patterns need not be the result of energizing the same antenna elements of antenna system 250 with respect to cellular node B 230 and WLAN access point 240.

In addition to cellular node B 230, WLAN access point 240, and antenna system 250 discussed above, the embodiment of base station 110 illustrated in FIG. 2 includes beam pattern finder (BPF) 210 and extended range controller (ERC) 220 facilitating operation as described herein. As will be described in further detail below BPF 210 of preferred embodiments operates to estimate the best antenna beam pattern to the remote stations. Thereafter, ERC 220 of preferred embodiments operates to provide WLAN communication links, perhaps using directional antennas of antenna system 250 to provide a longer WLAN range.

It should be appreciated that current WLAN specifications provide relatively high bit rates in limited coverage areas. For example, the IEEE WLAN specifications provide for up to 54 Mbps within a limited coverage area (e.g., coverage area sub-portion 104 of coverage area portion 103 of FIG. 1). Although WLAN infrastructure may be capable of providing data communication throughout coverage area portion 103, the data rates provided in the sub-portions of the coverage area outside of coverage area sub-portion 104 will be at a lower data rate, such as 6, 12, or 24 Mbps. Likewise, although cellular systems provide for data communication in a much wider coverage area, the bit rates are substantially lower. For example, third-generation cellular provides for communication within a cell (e.g., coverage area 101 of FIG. 1) with a bit rate of 2 Mbps. The embodiment of FIG. 2 provides for extended WLAN high data rate coverage area by making use of directional antennas and/or provides for extended WLAN coverage by making use of directional antennas and signaling channel provided by the cellular system.

In conventional operation station 120 can enjoy communication provided by WLAN when station 120 is disposed at many positions inside the normal WLAN coverage area (coverage area portion 103 of FIG. 1), but can enjoy the highest bit rate communication provided by WLAN only when station 120 is disposed at positions inside of the WLAN high data rate coverage area (coverage area sub-portion 104 of FIG. 1). For example, when positioned very near base station 110, station 120 may be provided communication links with 54 Mbps data rates. However, although still located within the normal WLAN coverage area, when positioned further away from base station 110, station 120 may be provided communication links with much lower data rates, such as 6, 12, or 24 Mbps, if conventional WLAN communication techniques are implemented.

To extend the WLAN high bandwidth coverage area, base station 110 uses directional antenna beams provided by antenna system 250 to provide a longer WLAN range. According to one embodiment, station 120 located inside the normal WLAN coverage area (coverage area portion 103 of FIG. 1) but outside of the WLAN high data rate coverage area (coverage area sub-portion 104 of FIG. 1) uses a lower speed WLAN connection to raise a request for higher speed connection. Base station 110 uses a directional, preferably narrow, beam pattern corresponding to the location of the requesting station to provide a higher speed downlink WLAN connection. Uplink traffic may continue to be transmitted in the lower speed WLAN collection, if desired. For example, many subscriber station utilization models result in a high percentage of data transmission (e.g., 90% or more) being in the downlink, with only a small percentage of data transmission (e.g., 10% or less) being in the uplink, such as in the case of typical Internet connection scenarios, suggesting that a lower speed uplink may be acceptable in many circumstances.

However, embodiments of the present invention may utilize the increased gain attributes of directional beams to provide higher data rates in both the downlink and uplink, although perhaps not the same data rate in each link. For example, signal gain and signal isolation associated with the use of the aforementioned directional antenna beams may be utilized by the base station in both the downlink and the uplink to provide high speed WLAN communication (e.g., to provide a same bit rate in both the downlink and uplink communications). Additionally, high speed WLAN communication may be provided within the extended high speed WLAN coverage area by increasing WLAN transmission power at base station 110 in combination with using directional antenna beams. Accordingly, downlink traffic may be transmitted at a higher speed to station 120 (e.g., the downlink enjoys both the gain and isolation advantage associated with the directional antenna beam as well as improved signal to noise due to the increased transmit power level) while its acknowledgement and uplink traffic are transmitted through a somewhat lower speed WLAN uplink (e.g., the uplink enjoys the gain and isolation advantage associated with the directional antenna beam).

When station 120 is located outside the extended high speed WLAN coverage area but within the extended WLAN coverage area of base station 110 of FIG. 2 (i.e., disposed in coverage area portion 102), station 120 preferably uses cellular network communications to raise a high speed request. Base station 110 may respond to such a request by allocating a period of time to station 120 when a directional, preferably narrow, beam pattern corresponding to the location of the requesting station will be available for high speed WLAN communication. Station 120 and base station 110 may therefore exchange allocation information via the cellular network whereas high speed data communication is provided via WLAN links facilitated by smart antenna beams.

Alternatively, when station 120 is disposed in coverage area portion 102, high speed WLAN communication may be provided outside the extended high speed WLAN coverage area by increasing WLAN transmission power at base station 110 and/or using directional antenna beams. Downlink traffic may then be transmitted at higher speeds to station 120 while its acknowledgement and uplink traffic are transmitted through cellular system communication links. This WLAN/cellular downlink/uplink approach may not be desirable in particular situations because it ties the WLAN and cellular system together in the MAC layer. It should be appreciated that the foregoing WLAN/cellular downlink/uplink approach may be implemented with respect to stations disposed within coverage area portion 103 according to embodiments, if desired.

BPF 210 of the illustrated embodiment is utilized in determining appropriate antenna beam patterns to be utilized in providing the foregoing high data rate WLAN communication links with respect to station 120. For example, if station 120 is disposed inside of the extended high speed WLAN coverage area, BPF 210 may utilize WLAN access point 240 to find the best beam pattern for use with station 120. According to one embodiment, for each beam pattern (e.g., directional antenna beams 130-139 of FIG. 3), BPF 210 may send a null frame to the station and wait for the acknowledgement. BPF 210 may then compare the received signal strength of all these acknowledgements to determine which is the best pattern with respect to the station.

If station 120 is disposed outside of the extended high speed WLAN coverage area, BPF 210 of an embodiment utilizes cellular node B 230 to find the best beam pattern for the station. According to one embodiment, for each beam pattern (e.g., directional antenna beams 130-139 of FIG. 3), BPF 210 sends some data using an acknowledgment mode, such as RLC acknowledge mode of 3G cellular, and checks the received signal strength of all these acknowledgements to determine which is the best pattern with respect to the station.

According to embodiments, BPF 210 keeps an antenna beam pattern table recording the best beam patterns for each station operating within network 100. For example, this information may be stored in an antenna pattern database (such as a database of BPF 210 or another database provided within or coupled to base station 110) for selecting an antenna pattern for use in providing broadband data communication with the stations.

It should be appreciated that certain cellular systems, such as 3G cellular, and WLAN systems, such as IEEE 802.11b/g, operate on a similar bands. Accordingly, the best antenna beam pattern as determined for such a cellular system should similarly be suitable for such a WLAN system. This correspondence facilitates the use of cellular node B 230 in determining a best antenna beam configuration for use in providing high bandwidth WLAN links as discussed above.

According to embodiments of the invention, particular positions within coverage area 101 may not implement directional or otherwise specially adapted antenna beam patterns for providing high bandwidth WLAN data communication. For example, stations disposed within a WLAN high data rate coverage area, such as corresponding to coverage area subportion 104 of FIG. 1, may utilize antenna patterns native to the WLAN infrastructure, such as may comprise omni-directional antenna patterns. Accordingly, BPF 210 may not store an antenna pattern configuration in the foregoing antenna beam pattern table for such a station. Alternatively, BPF 210 may store information indicating that a native antenna pattern is to be implemented with respect to particular stations.

ERC 220 of the illustrated embodiment is utilized in establishing the foregoing high data rate WLAN communication links with respect to station 120. For example, when station 120 is located outside of the WLAN coverage area (e.g., beyond coverage area portion 103) and raises a request for a high speed connection, ERC 220 of one embodiment checks the aforementioned antenna beam pattern table for an appropriate beam pattern corresponding to the station. If there is enough capacity with respect to WLAN access point 240 to serve the request, ERC 220 schedules cellular node B 230 (signaling and/or low data rate payload data in the uplink) and/or WLAN access point 240 (high data rate payload data in the uplink and/or downlink) to communicate appropriate data and to cooperate with antenna system 250 to do antenna beam forming and notifies station 120 of the availability of data.

If station 120 is located inside of the WLAN coverage area (e.g., inside of coverage area portion 103 but beyond coverage area sub-portion 104) and raises a request for a high speed connection, ERC 220 of one embodiment checks the aforementioned antenna beam pattern table for an appropriate beam pattern corresponding to the station. In operation according to such an embodiment, ERC 220 need only schedule the different antenna beam patterns with respect to WLAN access point 240 and antenna system 250 as station 120 is already operating within the WLAN coverage area and is already in data communication with access point 240. Station 120 may not be aware of the use of directional antenna beams to provide high bandwidth data communication in the downlink and may continue sending uplink data using lower speed transmissions.

Figure 4:
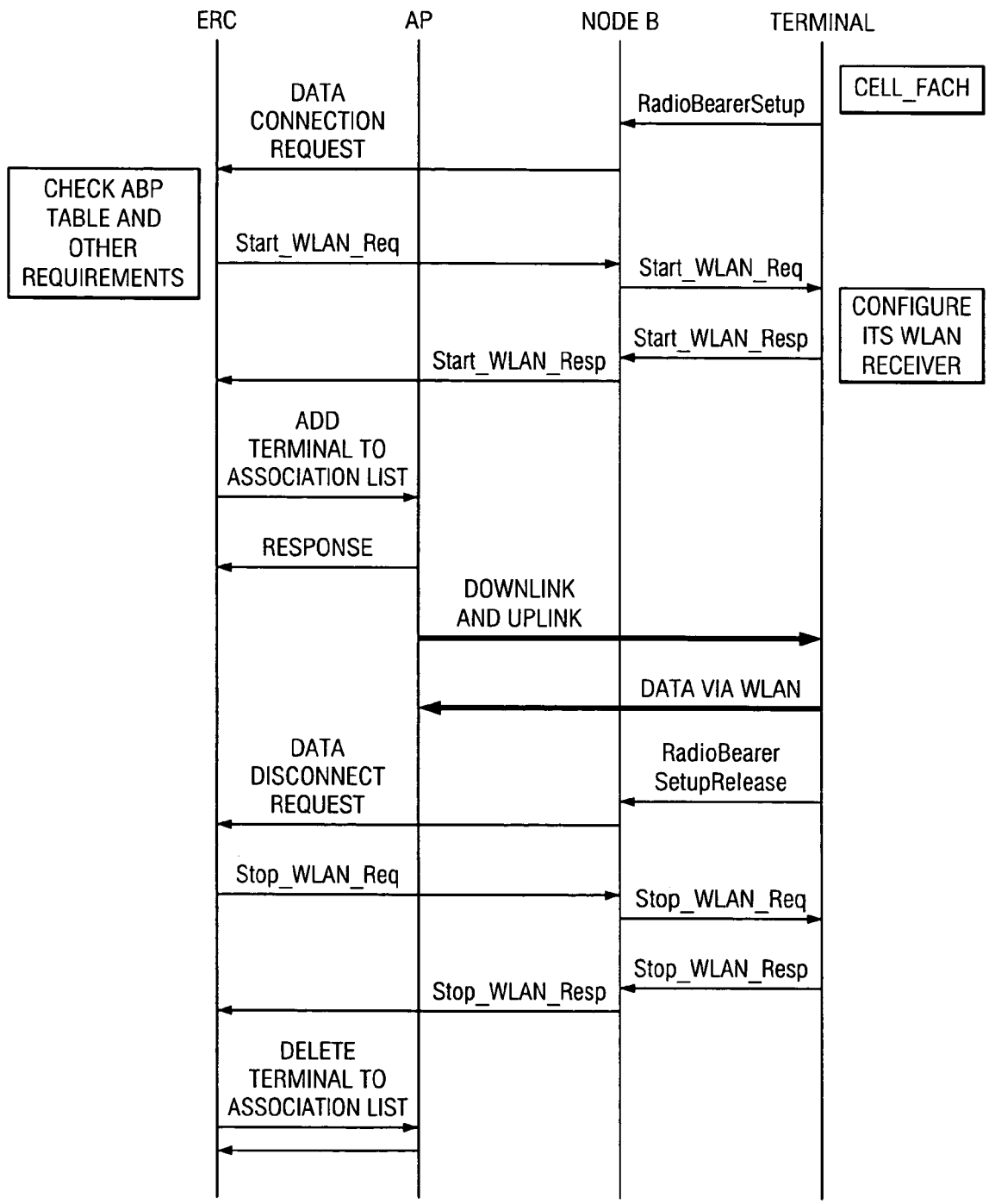
FIG. 4 shows an exchange sequence between an extended range controller, cellular node, and access point according to an embodiment of the invention.

In contrast to the foregoing, when station 120 is located outside the WLAN coverage area, ERC 220 of embodiments of the invention informs station 120 of the schedule of the antenna beam pattern via the underlying cellular network. Additionally, ERC 220 schedules different antenna beam patterns in the access point and passes authentication and association information to the access point. An exchange sequence between ERC 220, cellular node B 230, and WLAN access point 250 of one embodiment wherein station 120 is disposed in an extended WLAN coverage area (coverage area portion 102 of FIG. 1) is shown in FIG. 4. In the embodiment illustrated in FIG. 4, ERC 220 sends START_WLAN_Req to station 120 to inform the station that data will be transported by the WLAN and the schedule of beam pattern. Station 120 preferably stays in the CELL_FACH state to maintain a control channel with base station 110. When the session is completed, base station 110 sends a STOP_WLAN_Req via cellular network to terminal to stop the WLAN connection.

In operation according to embodiments of the invention, whenever WLAN access point 240 has data to be sent to station 120, WLAN access point 240 reads the beam pattern table to determine which antenna beam pattern should be used with respect to that particular station. If the targeted station does not have an entry in the table, a native antenna pattern, such as an omni-directional pattern, may be used. Likewise, when no data is to be communicated by access point 240, it switches to a native antenna pattern, such as the aforementioned omni-directional pattern, in order to be able to listen to all stations according to embodiments of the invention.

Figure 5:
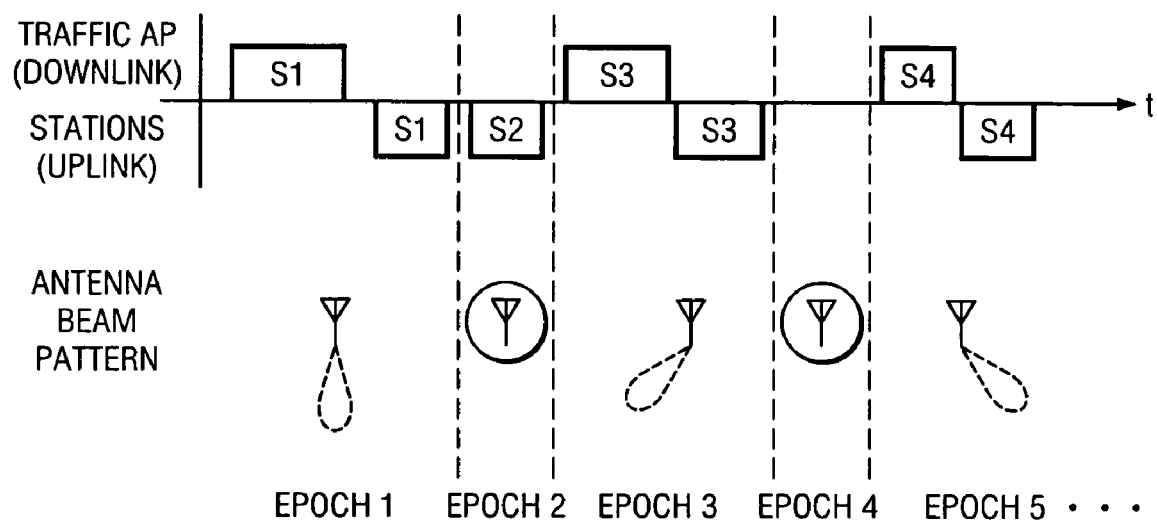
FIG. 5 shows beam switching by an access point according to an embodiment of the invention.

The result of such beam switching by WLAN access point 240 is illustrated in FIG. 5. In the illustration of FIG. 5 communication is conducted between WLAN access point 240 and various remote stations, represented as stations S1-S3. During epoch 1 of FIG. 5, WLAN access point 240 is in communication with station S1 using a first directional antenna beam associated with station S1 in a beam pattern table. At epoch 2 of FIG. 5, information is transmitted in the uplink by station S2 which is received by WLAN access point 240 through use of a native antenna pattern (shown here as an omni-directional pattern). It should be appreciated that station S2 may not have a directional antenna beam associated therewith in the above mentioned beam pattern table due to station S2 being disposed within a high data rate sub-portion of WLAN coverage area (coverage area sub-portion 104 of FIG. 1), because station S2 has recently been brought online and beam pattern table entries have not been made with respect thereto, etcetera. During epoch 3 of FIG. 5, WLAN access point 240 is in communication with station S3 using a second directional antenna beam associated with station S3 in the beam pattern table. At epoch 4 of FIG. 5, no communications are scheduled with respect to WLAN access point 240 and therefore a native antenna pattern (shown here as an omni-directional pattern) is used to "listen" for communication requests. During epoch 5 of FIG. 5, WLAN access point 240 is in communication with station S4 using a third directional antenna beam associated with station S4 in the beam pattern table.

Although the example of FIG. 5 shows alternating between narrow antenna patterns and native antenna patterns, it should be appreciated that the present invention is not limited to such an implementation. For example, communications with respect to stations S3 and S4 may be scheduled "back-to-back," such that in one epoch a directional antenna beam associated with station S3 is used in one epoch and a directional antenna beam associated with station S4 is used in the next epoch. Likewise, there is no limitation that different antenna beam patterns be utilized with respect to each station. Where a "best" antenna beam pattern for multiple stations is a same antenna beam pattern, this same antenna beam pattern may be utilized by WLAN access point 240 in providing communication with respect to each of those stations. According to one embodiment, communications with respect to stations utilizing a same antenna beam pattern are scheduled in contiguous epochs, where possible, in order to reduce control overhead associated with antenna beam switching etcetera.

As discussed above, embodiments of the invention utilize control channel signaling, such as through the use of a cellular control channel, to schedule the foregoing antenna patterns for high speed WLAN communications in the uplink. For example, in the uplink direction, dual-mode WLAN clients could inform WLAN access point 240 of their intention to transmit uplink packets via a cellular control channel. WLAN access point 240, after gathering all uplink requests (perhaps with additional information such as receive signal strength information (RSSI), queue length, packet type, etcetera) may perform scheduling. The scheduled results may be broadcast through the cellular control channel downlink. At the specified schedules, WLAN access point 240 may switch the appropriate beam (e.g., a narrow beam associated with the particular station) and wait for uplink packets from the station during the scheduled interval.

It should be appreciated that, as the directional antenna beams utilized by WLAN access point 240 only point to a small group of stations during some operational epochs, other stations may appear as hidden nodes (e.g., present carrier sense collision avoidance issues). This hidden node problem may exist with respect to both the downlink and uplink directions. To mitigate the downlink problem, WLAN access point 240 of an embodiment of the present invention splits some power to transmit the downlink signal using a native antenna pattern, e.g., an omni-directional pattern, in addition to using a selected antenna pattern directed to a particular station for which high data rate downlink communication is being provided. In this embodiment, each station can sense the carrier and thus avoid hidden node issues. To mitigate hidden node issues with respect to the uplink, WLAN access point 240 may generate a downlink "busy-tone" within a native antenna pattern, e.g., an omni-directional pattern, upon receiving any uplink packets. In this way, the other stations will be able to sense the channel as busy, although not actually receiving the uplink signal, and thus avoid hidden node issues. The use of busy-tone generation for mitigating hidden node problems is further discussed in the above referenced patent application entitled "Busy Tone For Wireless Networks."

Figure 6:
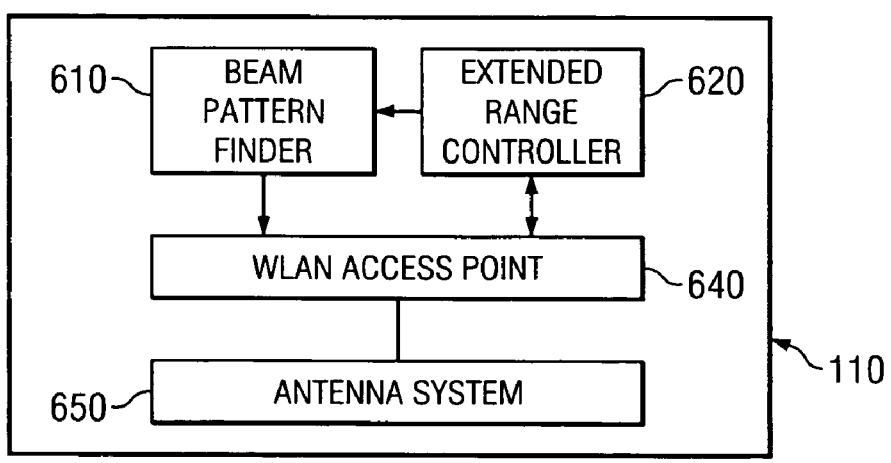
FIG. 6 shows a configuration of a base station adapted to provide range extension using adaptation of WLAN infrastructure according to an embodiment of the invention.

Directing attention to FIG. 6, an exemplary configuration of base station 110 adapted to provide range extension using adaptation of WLAN infrastructure according to an embodiment of the invention is shown. Although some WLAN chip set vendors (such as Atheros Communications of Sunnyvale, Calif.) offer a special range extension mode (e.g., by tuning the MAC parameters), field tests reveal that the throughput of a pair of such WLAN chip sets operating in extended range mode is very low. Therefore, it has been found that reliance on such commercially available WLAN infrastructure adaptations alone to deliver payload at a desired high data rate throughput provides disappointing results. Embodiments of the present invention make use of such proprietary modes of operation to extend the high throughput coverage to reliably deliver downlink packets.

Base station 110 of the embodiment of FIG. 6 is similar to that of the embodiment of FIG. 2, except there is only one radio interface (e.g., remote station 120 and base station 110 are not dual-mode). Base station 110 of FIG. 6 includes a communication node adapted to communicate according to WLAN protocols. Specifically, base station 110 of the illustrated embodiment includes WLAN access point 640, such as may provide for wireless communication according to IEEE 802.11 protocols, coupled to antenna system 650. WLAN access point 640 of embodiments of the invention is adapted to provide commercially available extended range WLAN communications, such as by employing a WLAN chip set available from Atheros. Antenna system 650 may provide multiple directional antenna beams, perhaps being angularly, spatially, gain, and/or beam width diverse (e.g., the angularly divers antenna beams of FIG. 3). As with antenna system 250 discussed above, additional or alternative antenna beam configurations may be utilized according to embodiments of the invention, such as omni-directional and/or antenna beams having a relatively broad beam width (e.g., 120° sector antenna beams). Antenna system 650 may be comprised of one or more antenna element configurations, including switched beam arrays, adaptive arrays, omni-directional antennas, and/or combinations thereof.

In addition to WLAN access point 640, and antenna system 650 discussed above, the embodiment of base station 110 illustrated in FIG. 6 includes BPF 610 and ERC 620 facilitating operation as described herein. Similar to the operation of BPF 210 and ERC 220 discussed above, BPF 610 of preferred embodiments operates to estimate the best antenna beam pattern to the remote stations and ERC 620 of preferred embodiments operates to provide WLAN communication links.

In operation according to a preferred embodiment, if station 120 is located outside the normal high speed WLAN coverage area (e.g., outside of coverage area sub-portion 104 of FIG. 1), the station may use the above mentioned proprietary extension mode to raise a high speed request. However, in addition to implementing the proprietary extension mode of WLAN access point 640, base station 110 of a preferred embodiment allocates a period of time to the terminal when a corresponding antenna pattern, determined to be appropriate for providing high data rate WLAN communication with respect to that station, will be used. Station 120 and base station 110 preferably exchange allocation information via the extension mode.

Alternatively, allocation of communication resources to provide high data rate WLAN communication to station 120 located outside the normal high speed WLAN coverage area may be implemented by sending a clear to sent (CTS) frame, or other channel flow control protocol, with a long duration to the targeted station. All other stations in the coverage area will preferably sense the frame and set their network allocation vector (NAV), or other channel flow control protocol, according to the duration field in the CTS frame. As a result, these stations would not try to gain access to the channel and the channel is reserved for the targeted station.

In operation according to embodiments of the invention, BPF 610 utilizes extension mode operation, if a station is outside the WLAN coverage area (e.g., beyond coverage area portion 103), to identify a best beam pattern for the station. For example, for each beam pattern, BPF 610 may send a null frame to the station and wait for the acknowledgement. BPF 610 may then compare the received signal strength of each of these acknowledgements to determine which is the best antenna pattern with respect to that station. Using the foregoing information, BPF 610 may establish a table or database of appropriate antenna beam patterns for use with respect to particular remote stations.

In operation according to embodiments of the invention, ERC 620 coordinates the exchange of control information and implements the appropriate antenna patterns for providing a high data rate WLAN connection with respect to station 120. For example, when station 120 is located outside the WLAN coverage area (e.g., beyond coverage area portion 103) and raises a request for high speed connection, ERC 620 of an embodiment checks the foregoing antenna beam pattern table for available beam pattern corresponding to that station. If there is enough capacity with respect to WLAN access point 640, ERC 620 schedules WLAN access point 640 for the data communication and controls antenna system 650 to provide the appropriate antenna beam forming according to the schedule.

Implementation of antenna beam pattern switching and addressing hidden node issues are substantially the same for the range extension using adaptation of WLAN infrastructure embodiment of FIG. 6 as discussed with respect to cellular assisted range extension embodiment of FIG. 2. Accordingly, these aspects of the operation of the embodiment illustrated in FIG. 6 will not be further discussed herein.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of providing extended high data rate communication in a network using wireless local area network infrastructure, said method comprising:

deploying a base station for use in conducting wireless communication within a communication coverage area, said base station including a wireless local area network access point to provide wireless data communication within a wireless local area network coverage area, said wireless local area network coverage area including a high data rate communication coverage area portion and a lower data rate communication coverage area portion, and an antenna system coupled to said access point, said antenna system providing an antenna pattern native to said access point and a plurality of narrow antenna beam patterns which are selectively implemented with respect to signals associated with said access point;

determining a best antenna pattern of said plurality of narrow antenna beam patterns for use with respect stations of a plurality of stations disposed within said wireless coverage area;

recognizing initiation of communication between said base station and a first station of said plurality of stations disposed within said high data rate communication coverage area portion;

scheduling high data rate communication between said first station and said base station using an antenna pattern native to said access point;

recognizing initiation of communication between said base station and a second station of said plurality of stations disposed within said wireless coverage area but outside of said high data rate communication coverage area portion;

selecting an antenna pattern of said determined best antenna patterns associated with said second station; and scheduling high data rate communication between said second station and said base station using said selected antenna pattern, wherein said initiation of communication between said base station and said second station is between said access point and said second station, said initiation of communication comprising lower data rate communication than said high data rate communication.

2. The method of claim 1, wherein said second station is disposed within said lower data rate communication coverage area portion.

3. A method of providing extended high data rate communication in a network using wireless local area network infrastructure, said method comprising:

deploying a base station for use in conducting wireless communication within a communication coverage area, said base station including a wireless local area network access point to provide wireless data communication within a wireless local area network coverage area, said wireless local area network coverage area including a high data rate communication coverage area portion and a lower data rate communication coverage area portion, and an antenna system coupled to said access point, said antenna system providing an antenna pattern native to said access point and a plurality of narrow antenna beam patterns which are selectively implemented with respect to signals associated with said access point;

determining a best antenna pattern of said plurality of narrow antenna beam patterns for use with respect stations of a plurality of stations disposed within said wireless coverage area;

recognizing initiation of communication between said base station and a first station of said plurality of stations disposed within said high data rate communication coverage area portion;

scheduling high data rate communication between said first station and said base station using an antenna pattern native to said access point;

recognizing initiation of communication between said base station and a second station of said plurality of stations disposed within said wireless coverage area but outside of said high data rate communication coverage area portion;

selecting an antenna pattern of said determined best antenna patterns associated with said second station; and scheduling high data rate communication between said second station and said base station using said selected antenna pattern, wherein said base station further including a cellular node to provide wireless data communication within said communication coverage area, wherein said initiation of communication between said base station and said second station is between said cellular node and said second station, said initiation of communication comprising communication through a separate network than said wireless local area network.

4. The method of claim 3, wherein said second station is disposed outside of said wireless local area network coverage area.

5. The method of claim 1, wherein said selecting said antenna pattern and said scheduling said high data rate communication provide an extended wireless local area network coverage area substantially co-extensive with said communication coverage area.

6. The method of claim 1, further comprising:
coupling said access point native antenna pattern to said access point when data communication using said access point is not otherwise scheduled.

7. The method of claim 1, wherein said access point comprises an access point operable according to IEEE 802.11 protocols.

* * * * *